United States Patent [19]

Livesay

[11] 4,020,959

[45] May 3, 1977

[54] CART CONSTRUCTION

[75] Inventor: Richard E. Livesay, Peoria, Ill.

[73] Assignee: Caterpillar Tractor Co., Peoria, Ill.

[22] Filed: July 14, 1975

[21] Appl. No.: 595,824

[52] U.S. Cl. .................................. 214/84; 188/5; 193/35 A; 280/47.35

[51] Int. Cl.$^2$ ........................ B60P 1/52; B60T 1/14

[58] Field of Search ............. 214/84, 38 B, 38 BA, 214/38 BB; 188/5; 193/35 A; 280/47.35

[56] References Cited

UNITED STATES PATENTS

| 2,630,961 | 3/1953 | Burg | 188/5 X |
|---|---|---|---|
| 2,720,989 | 10/1955 | Wormser | 214/84 |
| 2,979,177 | 4/1961 | Sullivan | 193/35 A |
| 3,435,969 | 4/1969 | McCartney et al. | 214/84 |

Primary Examiner—Robert G. Sheridan

Attorney, Agent, or Firm—Wegner, Stellman, McCord, Wiles & Wood

[57] ABSTRACT

A cart construction having improved structure for selectively retaining removable transport containers thereon including brake structure for selectively preventing movement of one or more roller elements supporting the transport container on the cart. The brake structure is biased to lock the rollers and an operator is provided for engagement by the user of the cart to effect release of the brake structure when desired to permit lateral movement of the transport container from the cart. A step structure is provided for permitting ascent by the cart user to facilitate reaching into the bottom of the transport container carried on the cart. A cart locking structure is associated with the step structure to lock the cart against movement while the user is so utilizing the step structure.

18 Claims, 5 Drawing Figures

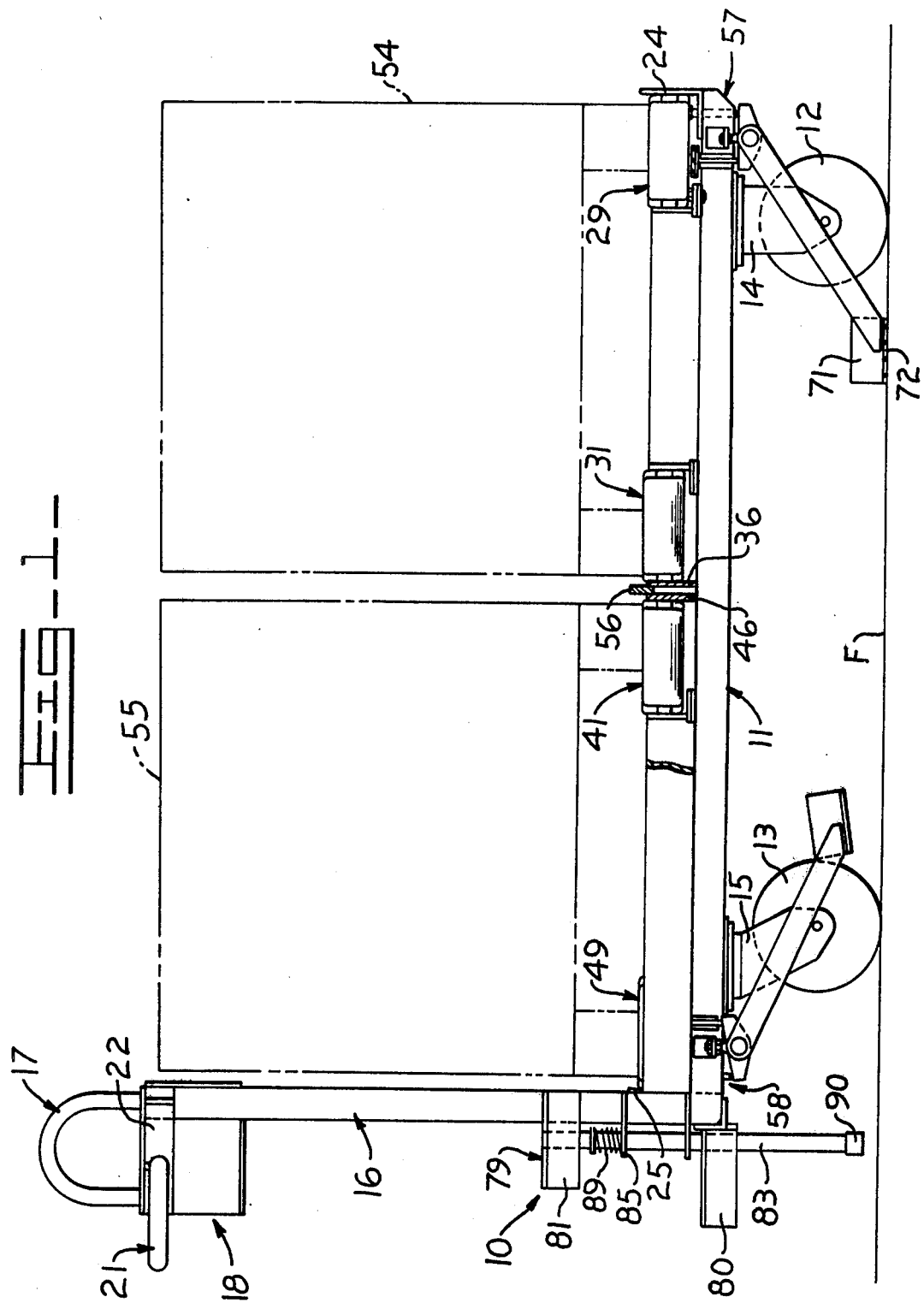

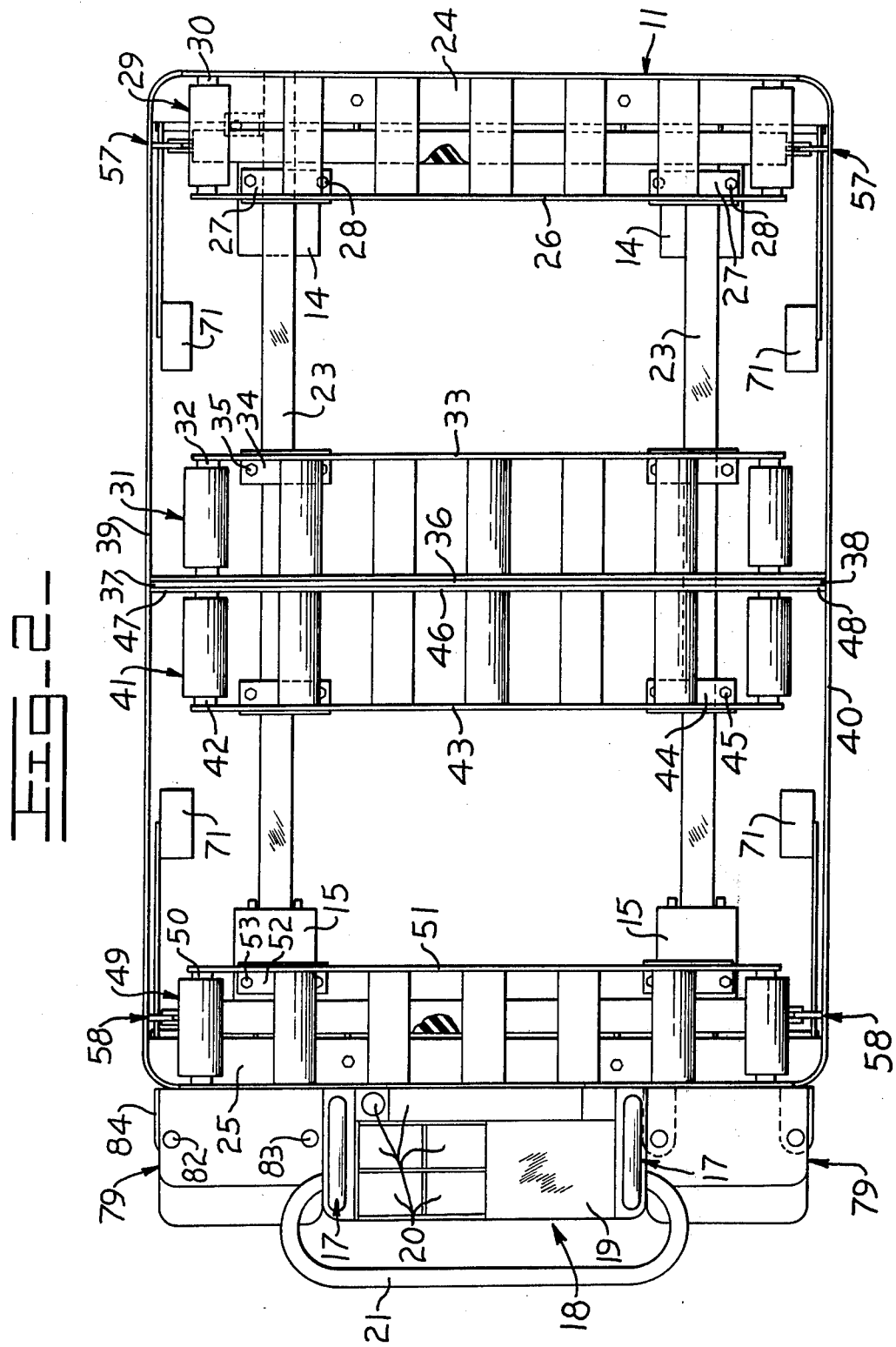

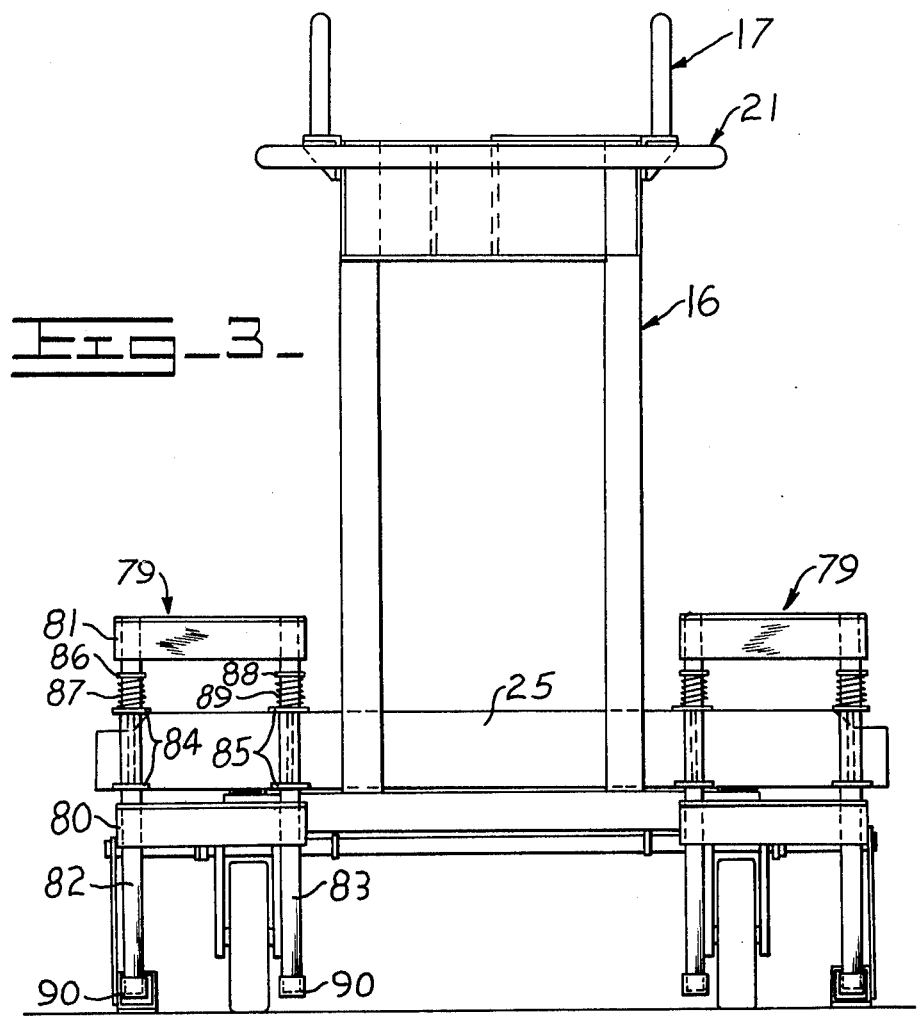
Fig-3-
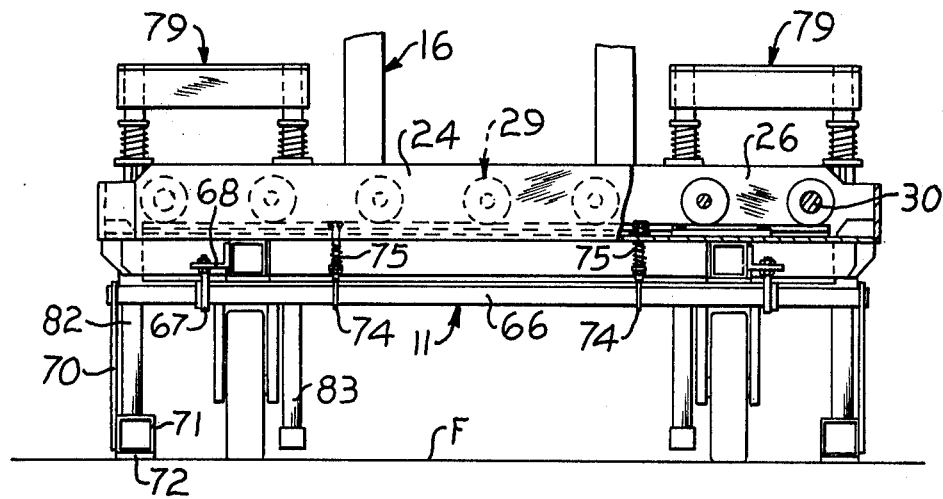
Fig-4-

CART CONSTRUCTION

BACKGROUND OF THE INVENTION

1. Field of the Invention

This invention relates to cart constructions and in particular to transport carts such as order-filling push carts.

2. Description of the Prior Art

There have been developed many types of carts for transporting materials. One form of such carts comprises a wheeled push cart provided with a roller at the side of a platform thereon for facilitating loading and unloading onto and from the cart.

In a more specific form of such material handling carts, the cart is arranged for use in order picking. Thus, the cart may be provided with removable transport containers adapted to receive picked articles and the like such as for use in warehousing and stocking operations.

In one form of cart, folding steps and retractable handrails are provided to enable the operator to mount the cart after the load is raised by a hand winch or the like to facilitate transfer of the load to elevated bins or the like.

One cargo handling cart of the prior art for handling palletized freight is illustrated in U.S. Pat. No. 3,489,300, of Duane M. McCartney et al. Rollers are provided on the cart for movably supporting the freight and locking elements are provided for selectively engaging the freight to retain it on the cart notwithstanding the free rolling arrangement of the rollers.

In another form of prior art order picker, a sack truck is provided with a set of steps which are releasable from the truck by suitable catch means. The steps cooperate with the truck when installed thereon to define means for permitting the user to climb to elevated bins or the like in the stock picking and handling operation.

SUMMARY OF THE INVENTION

The present invention comprehends a cart construction having improved means for locking the cart against movement when the transport containers are being moved laterally onto or from the cart.

The cart construction may include rollers for supporting the treansport containers and brake means for selectively locking one or more of the rollers against rotation to retain the transport container on the cart against lateral movement.

The present invention comprehends an improved structural arrangement wherein the means for releasing the brake means further defines the means for locking the cart against wheeled movement during the transport container lateral movement operation.

More specifically, the brake means may be biased to the roller-locking position and the brake release means may include friction means engageable with the subjacent floor surface when operated to release the biased brake means.

The invention further comprehends an improved step structure permitting the cart operator to ascend to a position wherein reaching into the bottom of the transport container is facilitated. The step structure further defines friction means for engaging the subjacent floor surface when the operator ascends the step structure for automatically locking the cart against wheeled movement while the operator is supported thereon.

Thus, the invention broadly comprehends the provision of a plurality of different elements for locking the cart against wheeled movement during different material handling operations as an automatic concomitant of effecting such material handling operations.

The invention further comprehends the provision of means for adjusting the braking effort for facilated maintenance and positive transport container retention. The invention comprehends the provision of brake means in connection with one or more sets of container supporting rollers and may utilize one or more brake release means in effecting the desired control of the transport containers.

The invention further comprehends the use of one or more sets of steps for providing facilitated access to the bottom of the transport containers from one or more positions on the cart.

Thus, the cart construction of the present invention is extremely simple and economical of manufacture while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a cart construction embodying the invention;

FIG. 2 is a top plan view thereof;

FIG. 3 is a rear elevation thereon;

FIG. 4 is a fragmentary front elevation thereof with portions broken away to facilitate illustration of the transport container rollers.

DESCRIPTION OF THE PREFERRED EMBODIMENT

Figure 5:
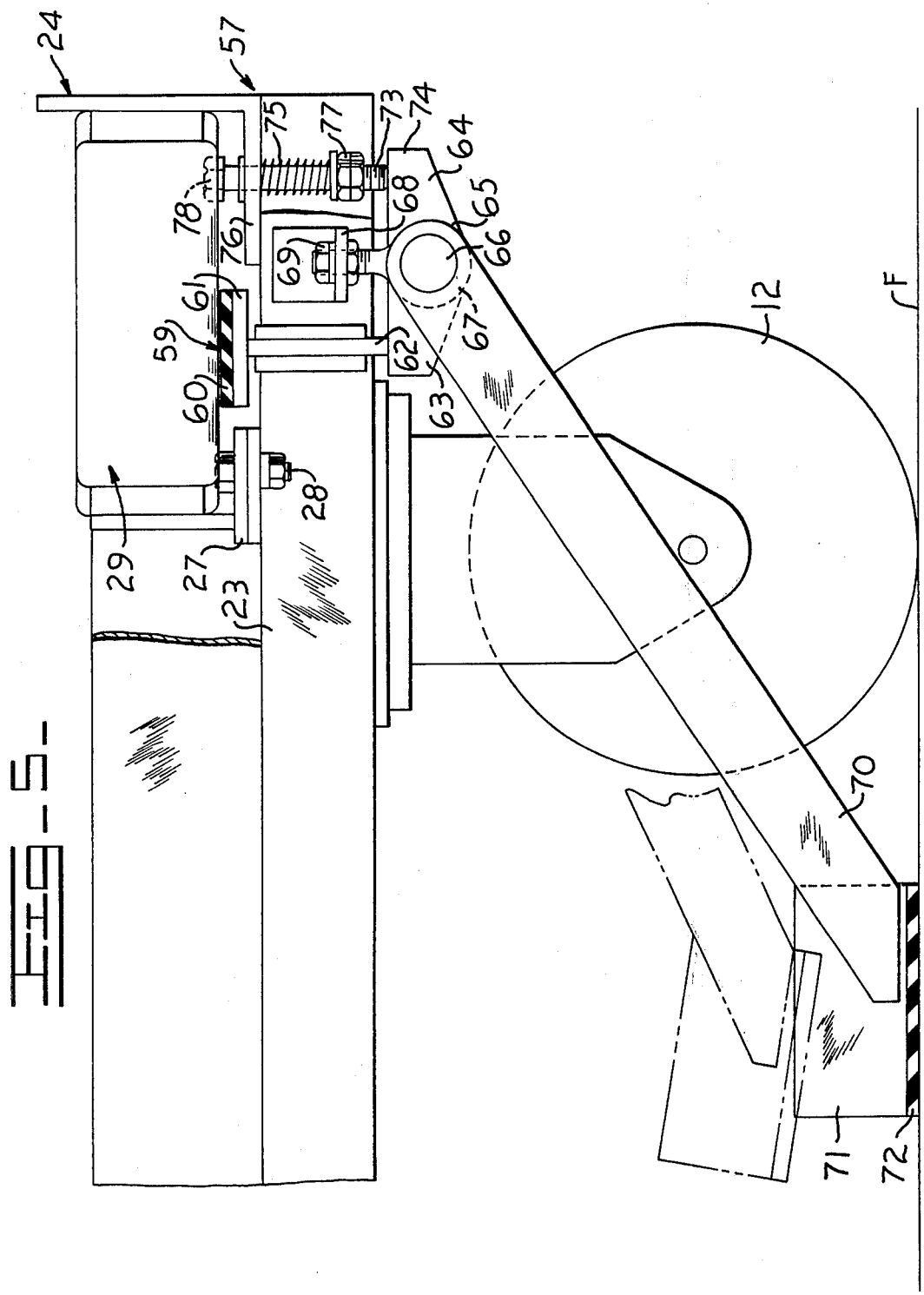
FIG. 5 is a fragmentary side elevation illustrating in greater detail the roller brake means and associated cart locking means.

In the exemplary embodiment of the invention as disclosed in the drawing, a cart construction generally designated 10 is shown to comprise a base 11 provided with a pair of front wheels 12 and a pair of rear wheels 13. Front wheels 12 may be mounted to the base by fixed brackets 14 and wheels 13 may be mounted to the base by conventional swivel brackets 15.

At the rear end of the base, the cart is provided with an upstanding end structure generally designated 16 provided at its upper end with a pair of handles 17. Subjacent handles 17 is an operator station 18 including a writing table 19 and a plurality of storage compartments 20 for holding computer cards, tag wires, etc., for use in the material handling operation. In addition to the upstanding handles 17, a push handle 21 is mounted to the end structure 16 by a bracket 22.

As best seen in FIG. 2, base 11 is defined by a pair of support tubes 23 which, in the illustrated embodiment, are spaced approximately 22 inches center-to-center. Wheel brackets 14 are secured to the front end of the support tubes 23 and swivel brackets 15 are secured to the rear end thereof. Extending laterally across the cart on the support tubes is a pair of end angles 24 and 25 which may be secured to the support tubes as by welding. A cross member 26 is secured to the front end of the support tubes 23 by angle brackets 27 and bolts 28. A first set of rollers 29 is rotatably mounted on supports 30 extending between front angle 24 and cross member 26.

A second set of rollers 31 is rotatably mounted on supports 32 extending between a second cross member 33 secured to support tubes 23 by brackets 34 and bolts 35, and a third cross member 36 having opposite ends 37 and 38 secured to side plates 39 and 40 at the opposite sides of base 11. A third set of rollers 41 is rotatably mounted on supports 42 extending between a fourth cross member 43 secured to support tubes 23 by brackets 44 and bolts 45, and a fifth cross member 46 having opposite ends 47 and 48 secured to side plates 39 and 40, respectively. A fourth set of rollers 49 is rotatably mounted on supports 50 extending between angle 25 and a sixth cross member 51 secured to the rear end of support tubes 23 by brackets 52 and bolts 53.

As best seen in FIG. 1, rollers 29, 31, 41 and 49 cooperatively define a support surface for removably carrying a plurality of transport containers 54 and 55. A guide bar 56 may be provided between cross members 36 and 46, as shown in FIG. 1, for cooperating with the upper end of the end angles 24 and 25 in guiding movement of the transport containers laterally onto the respective rollers. In normal use, the cart may be wheeled to adjacent a conveyor having its upper surface substantially flush with the support surface defined by the cart rollers so that the transport containers may be readily transferred therebetween by simple lateral rolling movement as desired.

The invention comprehends the locking of the transport containers 54 and 55 onto the cart transport surface by selectively preventing rotation of one or more of the rollers carrying the transport container. The locking means is generally illustrated in FIG. 1 as comprising a front locking means generally designated 57 and a rear locking means generally designated 58. The front and rear locking means are reversely similar and reference may be had to FIG. 5 disclosing more specifically thE construction of front locking means 57 for a full understanding of the construction of each locking means.

Thus, more specifically, as shown in FIG. 5, front locking means 57 includes a brake element 59 including a brake pad 60 and a T-shaped carrier 61 having a lower end 62 engaged by one end 63 of a lever 64 having a mid-portion 65 pivotally mounted on a rod 66 journaled in a pair of eye bolts 67 secured to a pair of brackets 68 on support tubes 23 by means of nuts 69. Extending integrally from mid-portion 65 of lever 64 is an arm 70 carrying at its outer end a foot pedal 71 provided on its undersurface with a friction pad 72.

The levers 64 are biased in a clockwise direction, as seen in FIG. 5, by push rods 73 urged downwardly against the front end portion 74 of the levers by compression springs 75. The springs are captured between the bottom flange 76 of the front angle 24 and a threaded element 77 on the lower end of the push rod providing for adjustable extension of the springs to adjust the biasing force exerted by the push ron on the lever end 74. The upper end of the push rod may be provided with a bolt 78.

Thus, as shown in FIG. 5, springs 75 normally bias the brake element 59 upwardly against the rollers 29 to lock the rollers against rotation and, thus, retain the transport container thereon against lateral movement. At the same time, the biasing action of springs 75 positions the pedal 71 in a raised, or retracted, position, as shown in broken lines in FIG. 5, permitting free wheeled movement of the cart. When the operator wishes to move the transport container 54 on the supporting rollers 29 and 31, he need merely step on the pedal 71 to rotate lever 64 in a counterclockwise direction, as seen in FIG. 5, thereby releasing the brake element 59 from retaining engagement with rollers 29 and concurrently locking the cart against movement on the subjacent floor surface F by the engagement of friction pad 72 therewith. As the foot pedal 71 is disposed adjacent a side of the cart, the operator is in position to effect the desired movement of the transport container when depressing the foot pedal. As a pair of such foot pedals is provided on opposite sides of the cart, as shown in FIG. 2, the desired lateral movement of the transport container may be effected similarly from either side of the cart. (Further as discussed above, the transport container 55 may be similarly controlled by the similar rear locking means 58 having similar pedals 72 at opposite sides of the cart.)

Upon the operator releasing the foot pedal 71, spring 75 restores the braking effort of brake element 59 against the superjacent rollers to again lock the transport container in position on the support surface defined by the two sets of rollers on which it is carried. Adjustable element 77 may be adjusted to adjust the biasing force of spring 75 for facilitated maintenance of the locking means as the brake pad 60 wears in normal use, and further may be adjusted to provide a desired locking force which, illustratively, may be varied by approximately fifty percent within the permitted range of adjustment of element 77.

The invention further comprehends the provision of an improved step means generally designated 79 permitting the operator of the cart to ascend suitably to facilitate reaching into the bottom of transport container 55. Such ascent may be assisted by the handles 17 and 21. As illustrated in FIG. 2, a pair of step means 79 may be provided, one each at opposite sides of the cart at the rear end thereof.

As best seen in FIGS. 2 and 3, each step means may comprise a pair of steps 80 and 81 fixedly secured to a pair of upright posts 82 and 83. A pair of support brackets 84 is provided on front angle 25 for vertically movably mounting post 82 and a second pair of brackets 85 is provided on front angle 25 for vertically movably mounting Post 83. Post 82 carries a collar 86 spaced above the top bracket 84 for capturing a compression spring 87 therebetween, and post 83 carries a collar 88 spaced above the top bracket 84 for capturing a compression spring 89 therebetween. The lower end of each post is provided with a friction element 90 adapted to engage the subjacent floor surface F when the cart operator steps on steps 80 and 81, thereby automatically locking the cart against wheeled movement. The use of steps 80 and 81 permits the operator to ascend to a position facilitating reaching into the bottom portion of container 55, such as for inserting or removing small packages or articles. During such ascent on steps 80 and 81, the operator may utilize handles 17 and 21 for safety, as briefly indicated above. As the step structures 79 are mounted on opposite sides of the cart adjacent the rear push end of the cart, they are immediately available for use by the operator subsequent to positioning of the cart by wheeled movement thereof.

In the illustrated embodiment, the steps are spaced approximately 10 inches apart and the bottom step is spaced approximately 10 inches above the lower end of posts 82 and 83, whereby the operator may ascend approximately 20 inches on the steps for a facilitated material handling operation as discussed above.

Wheels 12 and 13 illustratively may comprise relatively large diameter wheels having relatively high load capacity. In the illustrated embodiment, the wheels comprise 8-inch diameter wheels, each having a 1,000 lb. carrying capacity with the rolling surfaces being formed of a synthetic resin, such as polyurethane.

Each of brake pad 60, friction pad 72, and friction elements 90 may be formed of rubber preselected to provide the desired locking action.

The structural elements of the cart are preferably formed of a lightweight metal, such as aluminum, and the cart may be designed to have a total weight of less than approximately 275 lbs. while being adapted to carry a load of up to approximately 4000 lbs.

Thus, the present invention comprehends an improved cart construction wherein different material handling operations effected in the normal use of the cart concurrently effect a locking of the cart against wheeled movement. As the means for effecting the desired locking comprises a plurality of spaced means, the locking function may be effected from a plurality of different positions about the cart for further facilitated material handling operation.

The foregoing disclosure of specific embodiments is illustrative of the broad inventive concepts comprehended by the invention.

I claim:

1. In a cart having a wheeled base defining a front end, a rear end, and sides, and roller means defining a support surface for removably carrying a transport container, said roller means being rotatable about axes parallel to said sides, the improvement comprising: a brake element; means for biasing said brake element against said roller means for frictionally preventing lateral movement of the container on said roller means; and brake release means having foot pedal operating means spaced from said cart ends at a side of said cart substantially centrally of said roller means for selectively releasing said brake element from said roller means against the action of said biasing means to permit the container to be moved horizontally on said roller means sidewise of said cart selectively toward and from the operator only when the operator is at said cart sides.

2. The cart structure of claim 1 wherein said biasing means includes manually adjustable means for adjusting the force of biasing of said brake element against said roller means.

3. The cart structure of claim 1 wherein said roller means comprises a plurality of transaxially spaced parallel rollers engaged by said brake element.

4. The cart structure of claim 1 wherein said brake element is urged upwardly against the roller means to effect the braking thereof, and said brake release means defines means for disabling the biasing means to permit the brake element to move downwardly from said roller means.

5. The cart structure of claim 1 wherein said brake release means defines means for engaging the supporting surface below the cart as an incident of operation thereof to release said brake element.

6. In a cart having a wheeled base, and roller means defining a support surface for removably carrying a transport container, the improvement comprising: a brake element; means for biasing said brake element against said roller means for frictionally preventing lateral movement of the container on said roller means; and brake release means on said cart for selectively releasing said brake element from said roller means against the action of said biasing means to permit the container to be moved horizontally on said roller means to laterally of said support surface, said brake release means defining means for engaging the supporting surface below the cart as an incident of operation thereof to release said brake element, said brake release means including a friction element for so engaging the supporting surface to further define means for preventing movement of the wheeled cart as the container is moved on the released roller means to laterally of said support surface.

7. In a cart having a wheeled base, and roller means defining a support surface for removably carrying a transport container, the improvement comprising: retaining means on said cart for selectively retaining said cart against wheeled movement on said support surface; means for locking said roller means to prevent movement of the container thereon during wheeled movement of the cart; and selectively operable means for (a) releasing said roller means to permit movement of the container thereon, and concurrently operating said retaining means for (b) locking the cart against wheeled movement as an incident of releasing said roller means.

8. The cart structure of claim 7 wherein said selectively operable means comprises a friction element, and said means for locking said roller means includes spring means further biasing said friction element to a position permitting free wheeled movement of the cart.

9. The cart structure of claim 7 wherein said cart support surface defines opposite sides, and said selectively operable means is disposed adjacent one of said sides, whereby the container may be urged toward the other side by a person concurrently operating said selectively operable means to release the roller means and lock the cart against movement.

10. In a cart having a wheeled base, and roller means defining a support surface for removably carrying a transport container, the improvement comprising: locking means for locking said roller means to prevent movement of the container thereon during wheeled movement of the cart; retaining means on said cart for selectively retaining said cart against wheeled movement on said support surface; first selectively operable means for (a) releasing said roller locking means to permit movement of the container on said roller means, and concurrently operating said retaining means for (b) locking the cart against wheeled movement as an incident of releasing said roller means; and second selectively operable means carried by said base for locking the cart against wheeled movement as an incident of a person stepping thereon, said second selectively operable means defining ascent means permitting said person to ascend suitably to reach into the bottom of said container with the cart being locked by said retaining means and movement of the container being prevented by said locking means.

11. The cart structure of claim 10 wherein said ascent means comprises means defining steps and spring means biasing said ascent means to permit free wheeled movement of the cart.

12. The cart structure of claim 10 wherein said cart defines a side and an end, said first selectively operable means being disposed adjacent said cart side, and said second selectively operable means being disposed adjacent said end.

13. The cart structure of claim 10 wherein handle means are provided adjacent said ascent means to be grasped by a person stepping on said ascent means.

14. The cart structure of claim 10 wherein said cart defines opposite sides and an end, said second selectively operable means comprising first ans second step means, said first step means being disposed at said end adjacent one side of the cart, and said second step means being disposed at said end and adjacent the other side of the cart.

15. In a cart having a wheeled base defining one end and a side, roller means defining a support surface for removably carrying a transport container, a brake element, means for biasing said brake element against said roller means for frictionally preventing lateral movement of the container on said roller means, and brake release means on said cart for selectively releasing said brake element from said roller means against the action of said biasing means to permit the container to be moved horizontally on said roller means to laterally of said support surface, the improvement comprising: step means movably carried on said cart for selectively permitting a person to ascend the step means to facilitate reaching into the bottom of said container; and friction means urged into locked association with a subjacent support surface on which the cart is disposed as an incident of the person stepping on said means to lock the cart against movement while the person is reaching into said container, the relative disposition of said brake release means and said step means being preselected to preclude concurrent use thereof.

16. The cart structure of claim 15 wherein spring means are provided for biasing said step means to a raised, retracted position.

17. The cart structure of claim 15 wherein handle means are disposed on said cart adjacent said step means for selective use in effecting wheeled movement of the unlocked cart and in facilitating ascent and ready operation with the cart locked against movement by the friction means.

18. The cart structure of claim 15 wherein a plurality of said step means are provided at horizontally spaced positions on the cart.

* * * * *